US012655373B2

(12) United States Patent
Besirik et al.

(10) Patent No.: US 12,655,373 B2
(45) **Date of Patent: *Jun. 16, 2026**

(54) PROCESS FOR MAKING A MAGNESIUM LINEAR ALKYL BENZENE SULPHONATE ANIONIC DETERSIVE SURFACTANT FLAKE

(71) Applicant: The Procter & Gamble Company, Cincinnati, OH (US)

(72) Inventors: Olgun Besirik, Newcastle upon Tyne (GB); Jason Allen Stamper, Covington, KY (US); Hossam Hassan Tantawy, Morpeth (GB)

(73) Assignee: The Procter & Gamble Company, Cincinnati, OH (US)

( * ) Notice: Subject to any disclaimer, the term of this patent is extended or adjusted under 35 U.S.C. 154(b) by 400 days.

This patent is subject to a terminal disclaimer.

(21) Appl. No.: 18/475,340

(22) Filed: Sep. 27, 2023

(65) Prior Publication Data

US 2024/0182825 A1 Jun. 6, 2024

Related U.S. Application Data

(60) Provisional application No. 63/430,378, filed on Dec. 6, 2022.

(51) Int. Cl.

*C11D 11/00* (2006.01)
*C11D 1/22* (2006.01)
*C11D 17/06* (2006.01)

(52) U.S. Cl.

CPC ................ *C11D 17/06* (2013.01); *C11D 1/22* (2013.01); *C11D 11/0082* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 2,717,243 A | | 9/1955 | Bloch et al. | |
| 3,265,624 A | * | 8/1966 | Inamorato | C11D 3/3958 510/330 |
| 3,691,106 A | * | 9/1972 | Erdy | C11D 3/3773 510/476 |
| 4,534,879 A | * | 8/1985 | Iding | C11D 1/37 510/192 |

FOREIGN PATENT DOCUMENTS

| | | |
|---|---|---|
| EP | 2167624 A1 | 3/2010 |
| GB | 2142341 A | 1/1985 |
| WO | 2008107463 A2 | 9/2008 |

OTHER PUBLICATIONS

Extended European Search Report and Search Opinion; Application No. 23200176.8 ; dated Mar. 7, 2024; 09 pages.
Extended European Search Report and Search Opinion; Application No. 23200178.4 ; dated Mar. 7, 2024; 09 pages.
All Office Actions; U.S. Appl. No. 18/475,345, filed on Sep. 27, 2023.
Unpublished U.S. Appl. No. 18/475,345, filed on Sep. 27, 2023, to Olgun Besirik et al.
Search Report and Written Opinion for PCT/US2023/075184 dated Dec. 4, 2023, 14 pages.
Search Report and Written Opinion for PCT/US2023/075186 dated Dec. 4, 2023, 14 pages.

* cited by examiner

*Primary Examiner* — Lorna M Douyon
(74) *Attorney, Agent, or Firm* — Gary J. Foose

(57) ABSTRACT

The present invention relates to a process for making a magnesium linear alkyl benzene sulphonate anionic detersive surfactant flake.

11 Claims, No Drawings

PROCESS FOR MAKING A MAGNESIUM LINEAR ALKYL BENZENE SULPHONATE ANIONIC DETERSIVE SURFACTANT FLAKE

FIELD OF THE INVENTION

The present invention provides a process for making a magnesium linear alkyl benzene sulphonate anionic detersive surfactant flake. The flakes obtained by the process provide good cleaning performance, have good physical characteristics, and have a good colour profile in that they are white. The flakes obtained by the process are suitable for incorporation into a laundry detergent product.

BACKGROUND OF THE INVENTION

Laundry detergent manufacturers formulate products with surfactants as the core chemistry to provide fabric cleaning during washing. One such surfactant category comprises anionic linear alkylbenzene sulphonates (LAS), which can be delivered in a number of physical forms. For the manufacture of solid powder detergents, these forms typically comprise a spray-dried particle, an agglomerated particle, or a flaked particle. Which of these forms is used typically depends on factors such as but not limited to the surfactant activity of the particle, the cost to manufacture the particle, the rate at which the particle can be produced, the physical properties of the particle, and/or any combination of these and/or other factors.

LAS flakes are typically the particles that carry highest LAS activity of the forms mentioned. The flakes can be produced via drum drying processes. Typically, the LAS present in drum-dried LAS flakes exists in its sodium salt form (Na-LAS). Whilst production rates might be lower than spray-drying or agglomeration/fluid-bed-drying processes, drum drying is more suited to dry viscous, concentrated solutions, e.g., to enable higher active end products. The downside of high active LAS particles is their propensity to become cohesive at relatively low relative humidity environments, due to the hygroscopic nature. This causes LAS flakes to become difficult to handle in bulk, or even when manufacturing, unless using a form of moisture control, which can present cost challenges, limit production/consumption rates, etc.

The inventors have found that when producing LAS flakes by drying a paste that has LAS with a very high proportion of magnesium LAS via drum drying, any adhesive make-up caused by the dried LAS flake on the knife that separates the dried flake from the drum after drying has been completely removed.

The inventors have also found that higher water activity can be tolerated when very high proportions of Mg LAS is present. Furthermore, the inventors found that the resulting Mg LAS flake appears much whiter compared to a Na-LAS flake.

The Mg LAS flake has good physical characteristics, results in dissolved LAS able to partake in emulsification of grease, and has a good colour profile, i.e., a white appearance.

SUMMARY OF THE INVENTION

The present invention provides a process for making a magnesium linear alkyl benzene sulphonate anionic detersive surfactant flake, wherein the process comprises the steps of:

(a) obtaining a magnesium linear alkyl benzene sulphonate anionic detersive surfactant paste,
 wherein the paste comprises from 30 wt % to 90 wt % solid material and from 10 wt % to 70 wt % water,
 wherein the solid material comprises from greater than 50 wt % to 100 wt % linear alkyl benzene sulphonate anionic detersive surfactant,
 and wherein the linear alkyl benzene sulphonate anionic detersive surfactant comprises from 70 wt % to 100 wt % magnesium linear alkyl benzene sulphonate anionic detersive surfactant;
(b) contacting the paste to a rotatable heated drum dryer;
(c) rotating the heated drum dryer and drying the contacted paste on the rotating heated drum dryer; and
(d) removing the dried contacted paste from the rotating heated drum dryer to form the magnesium linear alkyl benzene sulphonate anionic detersive surfactant flake,
 wherein the magnesium linear alkyl benzene sulphonate anionic detersive surfactant flake comprises from greater than 50 wt % to 100 wt % linear alkyl benzene sulphonate anionic detersive surfactant,
 and wherein the linear alkyl benzene sulphonate anionic detersive surfactant comprises from 70 wt % to 100 wt % magnesium linear alkyl benzene sulphonate anionic detersive surfactant.

DETAILED DESCRIPTION OF THE INVENTION

Process for Making a Magnesium Linear Alkyl Benzene Sulphonate Anionic Detersive Surfactant Flake The process for making a magnesium linear alkyl benzene sulphonate anionic detersive surfactant flake comprises the steps of:

(a) obtaining a magnesium linear alkyl benzene sulphonate anionic detersive surfactant paste,
 wherein the paste comprises from 30 wt % to 90 wt % solid material and from 10 wt % to 70 wt % water,
 wherein the solid material comprises from greater than 50 wt % to 100 wt % linear alkyl benzene sulphonate anionic detersive surfactant,
 and wherein the linear alkyl benzene sulphonate anionic detersive surfactant comprises from 70 wt % to 100 wt % magnesium linear alkyl benzene sulphonate anionic detersive surfactant;
(b) contacting the paste to a rotatable heated drum dryer;
(c) rotating the heated drum dryer and drying the contacted paste on the rotating heated drum dryer; and
(d) removing the dried contacted paste from the rotating heated drum dryer to form the magnesium linear alkyl benzene sulphonate anionic detersive surfactant flake,
 wherein the magnesium linear alkyl benzene sulphonate anionic detersive surfactant flake comprises from greater than 50 wt % to 100 wt % linear alkyl benzene sulphonate anionic detersive surfactant,
 and wherein the linear alkyl benzene sulphonate anionic detersive surfactant comprises from 70 wt % to 100 wt % magnesium linear alkyl benzene sulphonate anionic detersive surfactant.

Preferably, after removal from the rotatable heated drum dryer, the dried contacted paste is subjected to a size classification step, and wherein the flake formed has a $d_{50}$ particle width in the range of from 100 μm to 1200 μm, a $d_{50}$ particle length in the range of from 100 μm to 1200 μm, and a $d_{50}$ particle height or thickness in the range of from 100 μm to 1200 μm.

Preferably, the size classification step comprises a grind and/or sieve step.

After step (d), the flake can be cooled, for example to ambient temperature.

Preferably, the flake is incorporated into a laundry detergent composition.

Step (a) Obtaining a magnesium linear alkyl benzene sulphonate anionic detersive surfactant paste Step (a) obtains a magnesium linear alkyl benzene sulphonate anionic detersive surfactant paste.

Preferably, during step (a) the magnesium linear alkyl benzene sulphonate anionic detersive surfactant is obtained by reacting linear alkyl benzene sulphonic acid with a magnesium alkaline salt.

Preferably, during step (a) the reaction of linear alkyl benzene sulphonic acid with a magnesium alkaline salt occurs in the presence of water.

Preferably, during step (a) the magnesium alkaline salt is selected from a list that comprises magnesium hydroxide, magnesium carbonate, magnesium hydroxide carbonate, magnesium bicarbonate, and magnesium oxide.

Step (b) contacting the paste to a rotatable heated drum dryer

Step (b) contacts the paste to a rotatable heated drum dryer.

Preferably, during step (b) the rotatable heated drum dryer is rotating when the paste is contacted to it. Alternatively, the rotatable heated drum dryer is not rotating when the paste is contacted to it.

Preferably, during step (b) the rotatable heated drum dryer has a temperature in the range of from 100° C. to 200° C.

Preferably, during step (b) the paste has a temperature in the range of from 20° C. to 90° C. when it is contacted to the rotatable heated drum dryer.

Step (c) rotating the heated drum dryer and drying the contacted paste on the rotating heated drum dryer Step (c) rotates the heated drum dryer and dries the contacted paste on the rotating heated drum dryer.

Preferably, during step (c) the rotatable heated drum dryer has a temperature in the range of from 100° C. to 200° C.

Preferably, during step (c) the contacted paste is spread onto the rotating drum by passing the contacted paste through a gap that is formed by placing the rotatable heated drum dryer in close proximity to a spreading implement such that the gap distance between the rotatable heated drum dryer and the spreading implement is in range of from 100 μm to 1200 μm.

Alternatively, during step (c) the contacted paste spreads itself onto the rotating drum through gravitational forces that apply on the contacted paste as the rotatable heated drum is rotated, without passing the contacted paste through a gap.

Preferably, during step (c) the paste is contacted to the rotatable heated drum dryer for a residence time of from 30 secs to 60 min.

Step (d) removing the dried contacted paste from the rotating heated drum dryer to form the magnesium linear alkyl benzene sulphonate anionic detersive surfactant flake Step (d) removes the dried contacted paste from the rotating heated drum dryer to form the magnesium linear alkyl benzene sulphonate anionic detersive surfactant flake.

During step (d), the dried contacted paste can be removed from the rotatable heated drum dryer with a knife or scraper.

Magnesium linear alkyl benzene sulphonate anionic detersive surfactant paste

The magnesium linear alkyl benzene sulphonate anionic detersive surfactant paste comprises from 30 wt % to 90 wt % solid material and from 10 wt % to 70 wt % water.

Preferably, the paste comprises from 50 wt % to 70 wt % solid material and from 30 wt % to 50 wt % water.

Preferably, the paste has a viscosity of from 0.001 Pa·s to 100 Pa·s when measured at a shear rate of 1 reciprocal second.

Solid Material

The solid material comprises from greater than 50 wt % to 100 wt % linear alkyl benzene sulphonate anionic detersive surfactant.

Preferably, the solid material comprises from greater than 70 wt % to 100 wt %, or from 80 wt % to 99 wt %, or from 80 wt % to 95 wt % linear alkyl benzene sulphonate anionic detersive surfactant.

Preferably, the solid material comprises carboxylic acid, carboxylate polymers, soil release polymers, PEG polymers, carbohydrate polymers, chelants, brighteners, sulphate salts, chloride salts, carbonate salts, silicate salts, magnesium salts, zeolite, and any combination thereof.

Linear Alkyl Benzene Sulphonate Anionic Detersive Surfactant

The linear alkyl benzene sulphonate anionic detersive surfactant comprises from 70 wt % to 100 wt %, or from 80 wt % to 99 wt %, or from 80 wt % to 95 wt % magnesium linear alkyl benzene sulphonate anionic detersive surfactant.

Preferably, the linear alkyl benzene sulphonate anionic detersive surfactant comprises from 80 wt % to 100 wt %, or from 80 wt % to 99 wt %, or from 80 wt % to 95 wt % magnesium linear alkyl benzene sulphonate anionic detersive surfactant.

Magnesium linear alkyl benzene sulphonate anionic detersive surfactant flake

The magnesium linear alkyl benzene sulphonate anionic detersive surfactant flake comprises from greater than 50 wt % to 100 wt %, or from 60 wt % to 99 wt %, or from 70 wt % to 95 wt %, or from 80 wt % to 90 wt % linear alkyl benzene sulphonate anionic detersive surfactant.

Preferably, the flake is anhydrous or has a moisture content of from above 0 wt % to 10 wt % water.

The flake may comprise other ingredients, such as detergent ingredients, in addition to the linear alkyl benzene sulphonate anionic detersive surfactant.

Preferably, the alkyl benzene sulphonate anionic detersive surfactant flake comprises from greater than 70 wt % to 100 wt % linear alkyl benzene sulphonate anionic detersive surfactant, and wherein the linear alkyl benzene sulphonate anionic detersive surfactant comprises from 80 wt % to 100 wt % magnesium linear alkyl benzene sulphonate anionic detersive surfactant.

Preferably, the thickness of the flake is from 100 μm to 1200 μm.

Preferably, the particle size distribution of the flake is such that at least 90 wt % of the flakes have a particle width of less than 2000 μm, at least 90 wt % of the flakes have a particle length of less than 2000 μm, and at least 90 wt % of the flakes have a particle height or thickness of less than 2000 μm.

Preferably, the particle size distribution of the flake is such that at least 90 wt % of the flakes have a particle width of more than 50 μm, at least 90 wt % of the flakes have a particle length of more than 50 μm, and at least 90 wt % of the flakes have a particle height or thickness of more than 50 μm.

Preferably, the flake has an aspect ratio of from 1 to 20 to from 1 to 20 to from 1 to 20 of its length to its width to its height or thickness respectively.

Rotatable Heated Drum Dryer

Any suitable rotatable heated drum dryer can be used.

Preferably, the rotatable heated drum dryer has a diameter of from 0.4 m to 5.0 m.

Spreading Implement

Any suitable spreading implement can be used. More than one spreading implements can be used. A preferred spreading implement is a second rotatable heated drum dryer.

Other suitable spreading implements include rollers and/or knives.

EMBODIMENTS OF THE PRESENT INVENTION

1. A process for making a magnesium linear alkyl benzene sulphonate anionic detersive surfactant flake, wherein the process comprises the steps of:
(a) obtaining a magnesium linear alkyl benzene sulphonate anionic detersive surfactant paste, wherein the paste comprises from 30 wt % to 90 wt % solid material and from 10 wt % to 70 wt % water,
wherein the solid material comprises from greater than 50 wt % to 100 wt % linear alkyl benzene sulphonate anionic detersive surfactant,
and wherein the linear alkyl benzene sulphonate anionic detersive surfactant comprises from 70 wt % to 100 wt % magnesium linear alkyl benzene sulphonate anionic detersive surfactant;
(b) contacting the paste to a rotatable heated drum dryer;
(c) rotating the heated drum dryer and drying the contacted paste on the rotating heated drum dryer; and
(d) removing the dried contacted paste from the rotating heated drum dryer to form the magnesium linear alkyl benzene sulphonate anionic detersive surfactant flake,
wherein the magnesium linear alkyl benzene sulphonate anionic detersive surfactant flake comprises from greater than 50 wt % to 100 wt % linear alkyl benzene sulphonate anionic detersive surfactant,
and wherein the linear alkyl benzene sulphonate anionic detersive surfactant comprises from 70 wt % to 100 wt % magnesium linear alkyl benzene sulphonate anionic detersive surfactant.

2. A process according to embodiment 1, wherein the paste comprises from 50 wt % to 70 wt % solid material and from 30 wt % to 50 wt % water,
wherein the solid material comprises from greater than 70 wt % to 100 wt % linear alkyl benzene sulphonate anionic detersive surfactant,
and wherein the linear alkyl benzene sulphonate anionic detersive surfactant comprises from 80 wt % to 100 wt % magnesium linear alkyl benzene sulphonate anionic detersive surfactant.

3. A process according to any preceding embodiment, wherein the paste has a viscosity of from 0.001 Pa·s to 100 Pa·s when measured at a shear rate of 1 reciprocal second.

4. A process according to any preceding embodiment, wherein the solid material comprises carboxylic acid, carboxylate polymers, soil release polymers, PEG polymers, carbohydrate polymers, chelants, brighteners, sulphate salts, chloride salts, carbonate salts, silicate salts, magnesium salts, zeolite, and any combination thereof.

5. A process according to any preceding embodiment, wherein during step (b) the rotatable heated drum dryer is rotating when the paste is contacted to it.

6. A process according to any preceding embodiment, wherein during step (b) the paste has a temperature in the range of from 20° C. to 90° C. when it is contacted to the rotatable heated drum dryer.

7. A process according to any preceding embodiment, wherein during step (c) the rotatable heated drum dryer has a temperature in the range of from 100° C. to 200° C.

8. A process according to any preceding embodiment, wherein during step (c) the contacted paste is spread onto the rotating drum by passing the contacted paste through a gap that is formed by placing the rotatable heated drum dryer in close proximity to a spreading implement such that the gap distance between the rotatable heated drum dryer and the spreading implement is in range of from 100 μm to 1200 μm.

9. A process according to embodiment 8, wherein the spreading implement is a second rotatable heated drum dryer.

10. A process according to any preceding embodiment, wherein flake is anhydrous or has a moisture content of from above 0 wt % to 10 wt % water.

11. A process according to any preceding embodiment, wherein after removal from the rotatable heated drum dryer, the dried contacted paste is subjected to a size classification step, and wherein the flake formed has a $d_{50}$ particle width in the range of from 100 μm to 1200 μm, a $d_{50}$ particle length in the range of from 100 μm to 1200 μm, and a $d_{50}$ particle height or thickness in the range of from 100 μm to 1200 μm.

12. A magnesium linear alkyl benzene sulphonate anionic detersive surfactant flake obtained by a process according to any preceding embodiment.

13. A laundry detergent composition comprising a flake according to embodiment 12.

EXAMPLES

Example 1

Two pastes were made as liquid feed for the drum drying process with objective to produce a dried LAS flake.

| | Invention - Paste A | Paste B |
|---|---|---|
| $MgLAS_2$ [% w] | 61.8 | |
| NaLAS [% w] | | 61.5 |
| Polycarboxylate [% w] | 1.0 | 1.0 |
| Sodium sulphate [% w] | 4.5 | 4.5 |
| Moisture content [% w] | 32.7 | 32.8 |

Both flakes were separately dried on a drum dryer. The temperature at the outside of the drum was measured at 160±10° C. The outer diameter of the drum was measured at 127 mm. The rotational velocity of the drum was set to 1.3 revolutions per minute. The gap clearance to the drum was set to 381 μm. Approximately 7 grams of paste was applied to the drum from the top to create a discrete area of paste on the drum with a distance between the two ends of the area of paste, where the drum was not covered by paste. Whilst the paste was drying, the scraper was removed and replaced on the area of the drum that was not covered by the paste after 5 minutes of drying.

Using these settings, when Paste B touched the knife in an attempt to remove the dried paste/flake from the drum, material was observed to accumulate on the knife in rolling fashion as the full paste slab was removed. The rolled-up accumulation had to be manually removed from the knife. The rolled-up accumulation showed signs of darkening of the originally white feed material into a yellow/brown hue.

Using these settings, when Paste A touched the knife in an attempt to remove the dried paste/flake from the drum, material was observed to crumble off the knife without the need for manual removal of any matter. The resulting material was flake-like in nature, and white in appearance.

Example 2

Two pastes were made as liquid feed for the drum drying process with objective to produce a dried LAS flake.

| | Invention - Paste A | Paste B |
|---|---|---|
| $MgLAS_2$ [% w] | 56.4 | |
| NaLAS [% w] | 5.4 | 58.0 |
| Trisodium sulphosuccinate [% w] | | 1.4 |
| Sulphosuccinic acid [% w] | 1.0 | |
| Sodium sulphate [% w] | 4.1 | 4.1 |
| Moisture content [% w] | 32.5 | 36.7 |

Both flakes were separately dried on a drum dryer. The temperature at the outside of the drum was measured at 160±10° C. The outer diameter of the drum was measured at 127 mm. The rotational velocity of the drum was set to 1.3 revolutions per minute. The gap clearance to the drum was set to 50 μm. Approximately 7 grams of paste was applied to the drum from the top to create a discrete area of paste on the drum with a distance between the two ends of the area of paste, where the drum was not covered by paste. The paste was dried and scraped off using a knife before the drum made a full revolution.

Using these settings, the equilibrium relative humidity (or water activity) of the flake resulting from the dried Paste B was measured to be 18%+2%. Using these settings, the equilibrium relative humidity (or water activity) of the flake resulting from the dried Paste B was measured to be 31%+2%. Both flakes were free-flowing in nature.

Example 3

Eight pastes were made as liquid feed for the drum drying process with objective to produce a dried LAS flake.

| | Invention Paste A | Invention Paste B | Invention Paste C | Invention Paste D | Paste E | Paste F | Paste G | Paste H |
|---|---|---|---|---|---|---|---|---|
| NaLAS [% w] | | 5.4 | 6.2 | 11.0 | 31.0 | 33.6 | 61.8 | 61.9 |
| $Mg(LAS)_2$ [% w] | 61.8 | 56.4 | 55.6 | 50.8 | 30.9 | 28.2 | | |
| Polycarboxylate [% w] | 1.0 | | 1.0 | | 1.0 | | | 1.0 |
| Trisodium sulphosuccinate [% w] | | | | 0.1 | | 0.7 | 1.4 | |
| Sulphosuccinic acid [% w] | | 1.0 | | 0.9 | | 0.5 | | |
| Sodium sulphate [% w] | 4.5 | 4.1 | 4.5 | 4.1 | 4.5 | 4.1 | 4.1 | 4.5 |
| Moisture content [% w] | 32.8 | 32.5 | 32.8 | 32.5 | 32.7 | 32.6 | 32.7 | 32.6 |
| NaLAS [% w of total LAS] | 0 | 9 | 10 | 18 | 50 | 54 | 100 | 100 |
| $MgLAS_2$ [% w of total LAS] | 100 | 91 | 90 | 82 | 50 | 46 | 0 | 0 |
| Dried mass crumbles off the knife without need for manually removing accumulated dried mass off the knife | Yes | Yes | Yes | Yes | No | No | No | No |

All flakes were separately dried on a drum dryer. The temperature at the outside of the drum was measured at 160±10° C. The outer diameter of the drum was measured at 127 mm. The rotational velocity of the drum was set to 1.3 revolutions per minute. The gap clearance to the drum was set to 381 μm. Approximately 7 grams of paste was applied to the drum from the top to create a discrete area of paste on the drum with a distance between the two ends of the area of paste, where the drum was not covered by paste. Whilst the paste was drying, the scraper was removed and replaced on the area of the drum that was not covered by the paste after 5 minutes of drying.

Using these settings, Pastes A, B, C, and D were observed to come off the scraper in crumbling fashion without the need for manual intervention to remove the dried mass from the scraper. Using these settings, Pastes E, F, G, and H were observed to accumulate on the knife, the accumulated dried mass needing manual intervention to be removed from the scraper.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a magnesium linear alkyl benzene sulphonate anionic detersive surfactant flake, wherein the process comprises the steps of:

(a) obtaining a magnesium linear alkyl benzene sulphonate anionic detersive surfactant paste,
 wherein the paste comprises from about 30 wt % to about 90 wt % solid material and from about 10 wt % to about 70 wt % water,
 wherein the solid material comprises from greater than about 50 wt % to about 100 wt % linear alkyl benzene sulphonate anionic detersive surfactant, and wherein the linear alkyl benzene sulphonate anionic detersive surfactant comprises from about 70 wt % to about 100 wt % magnesium linear alkyl benzene sulphonate anionic detersive surfactant;

(b) contacting the paste to a rotatable heated drum dryer;

(c) rotating the heated drum dryer and drying the contacted paste on the rotating heated drum dryer; and (d) removing the dried contacted paste from the rotating heated drum dryer to form the magnesium linear alkyl benzene sulphonate anionic detersive surfactant flake,
 wherein the magnesium linear alkyl benzene sulphonate anionic detersive surfactant flake comprises from greater than about 50 wt % to about 100 wt % linear alkyl benzene sulphonate anionic detersive surfactant,
 and wherein the linear alkyl benzene sulphonate anionic detersive surfactant comprises from 70 wt % to about 100 wt % magnesium linear alkyl benzene sulphonate anionic detersive surfactant.

2. A process according to claim 1, wherein the paste comprises from about 50 wt % to about 70 wt % solid material and from about 30 wt % to about 50 wt % water,
 wherein the solid material comprises from greater than about 70 wt % to about 100 wt % linear alkyl benzene sulphonate anionic detersive surfactant,
 and wherein the linear alkyl benzene sulphonate anionic detersive surfactant comprises from about 80 wt % to about 100 wt % magnesium linear alkyl benzene sulphonate anionic detersive surfactant.

3. A process according to claim 1, wherein the paste has a viscosity of from about 0.001 Pa·s to about 100 Pa·s when measured at a shear rate of 1 reciprocal second.

4. A process according to claim 1, wherein the solid material further comprises carboxylic acid, carboxylate polymers, soil release polymers, polyethylene glycol (PEG) polymers, carbohydrate polymers, chelants, brighteners, sulphate salts, chloride salts, carbonate salts, silicate salts, magnesium salts, zeolite, or any combination thereof.

5. A process according to claim 1, wherein during step (b) the rotatable heated drum dryer is rotating when the paste is contacted to it.

6. A process according to claim 1, wherein during step (b) the paste has a temperature in the range of from about 20° C. to about 90° C. when it is contacted to the rotatable heated drum dryer.

7. A process according to claim 1, wherein during step (c) the rotatable heated drum dryer has a temperature in the range of from about 100° C. to about 200° C.

8. A process according to claim 1, wherein during step (c) the contacted paste is spread onto the rotating drum by passing the contacted paste through a gap that is formed by placing the rotatable heated drum dryer in close proximity to a spreading implement such that the gap distance between the rotatable heated drum dryer and the spreading implement is in range of from about 100 μm to about 1200 μm.

9. A process according to claim 8, wherein the spreading implement is a second rotatable heated drum dryer.

10. A process according to claim 1, wherein the flake is anhydrous or has a moisture content of from above about 0 wt % to about 10 wt % water.

11. A process according to claim 1, wherein after removal from the rotatable heated drum dryer, the dried contacted paste is subjected to a size classification step, and wherein the flake formed has a $d_{50}$ particle width in the range of from about 100 μm to about 1200 μm, a $d_{50}$ particle length in the range of from about 100 μm to about 1200 μm, and a $d_{50}$ particle height or thickness in the range of from about 100 μm to about 1200 μm.

* * * * *